(12) United States Patent
McCullough et al.

(10) Patent No.: US 9,827,978 B2
(45) Date of Patent: Nov. 28, 2017

(54) METHOD OF ENGAGING TRANSMISSION SYSTEM OF A HYBRID VEHICLE

(71) Applicant: Ford Global Technologies, LLC, Dearborn, MI (US)

(72) Inventors: Todd McCullough, Bloomfield Hills, MI (US); David Farrell, Dearborn, MI (US); George Edmund Walley, Novi, MI (US); Wei Liang, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 411 days.

(21) Appl. No.: 14/618,027

(22) Filed: Feb. 10, 2015

(65) Prior Publication Data

US 2016/0229393 A1    Aug. 11, 2016

(51) Int. Cl.
| | |
|---|---|
| *B60W 20/00* | (2016.01) |
| *B60W 10/02* | (2006.01) |
| *B60W 10/06* | (2006.01) |
| *B60W 10/08* | (2006.01) |
| *B60W 10/30* | (2006.01) |
| *B60K 6/547* | (2007.10) |
| *B60K 6/387* | (2007.10) |
| *F16H 61/00* | (2006.01) |
| *F16H 61/02* | (2006.01) |
| *B60W 20/30* | (2016.01) |

(Continued)

(52) U.S. Cl.
CPC ............ *B60W 20/30* (2013.01); *B60K 6/387* (2013.01); *B60K 6/547* (2013.01); *B60W 10/02* (2013.01); *B60W 10/06* (2013.01); *B60W 10/08* (2013.01); *B60W 10/115* (2013.01); *B60W 10/30* (2013.01); *B60W 30/18027* (2013.01); *B60W 30/18036* (2013.01); *B60W 30/19* (2013.01); *F16H 61/0031* (2013.01); *F16H 61/0265* (2013.01); *B60K 2006/4825* (2013.01); *B60W 2510/101* (2013.01); *B60W 2540/10* (2013.01); *B60W 2540/16* (2013.01); *B60W 2540/165* (2013.01); *B60W 2710/081* (2013.01); *B60W 2710/1005* (2013.01); *B60W 2710/1083* (2013.01); *Y02T 10/6252* (2013.01); *Y02T 10/6286* (2013.01); *Y10S 903/93* (2013.01)

(58) Field of Classification Search
None
See application file for complete search history.

(56) References Cited

U.S. PATENT DOCUMENTS

| | | | |
|---|---|---|---|
| 8,818,658 B2 | 8/2014 | Wang et al. | |
| 2004/0063533 A1* | 4/2004 | Silveri | B60K 6/48 475/116 |

(Continued)

*Primary Examiner* — Jacob S Scott
(74) *Attorney, Agent, or Firm* — David B. Kelley; Brooks Kushman P.C.

(57) ABSTRACT

A traction motor of a hybrid electric vehicle drives a primary pump to provide pressurized hydraulic fluid to engage a power flow path of a multi-ratio transmission. To reduce fuel consumption, the motor is maintained at zero speed until a shift lever is moved into a drive position. After a power flow path is established, the motor speed is again reduced to zero until a driver demands torque by pressing an accelerator pedal. While the traction motor is stationary, an auxiliary pump maintains the fluid pressure to keep the transmission power flow path engaged.

20 Claims, 5 Drawing Sheets

(51) Int. Cl.
*B60W 10/115* (2012.01)
*B60W 30/18* (2012.01)
*B60W 30/19* (2012.01)
B60K 6/48 (2007.10)

(56) References Cited

U.S. PATENT DOCUMENTS

| | | | |
|---|---|---|---|
| 2009/0321157 A1* | 12/2009 | Sowul | B60W 20/40 |
| | | | 180/65.22 |
| 2011/0135498 A1* | 6/2011 | Gibson | B60W 10/06 |
| | | | 417/15 |
| 2013/0179013 A1* | 7/2013 | Ivacko | B60W 10/06 |
| | | | 701/22 |
| 2013/0296108 A1 | 11/2013 | Ortmann et al. | |
| 2013/0296109 A1 | 11/2013 | Nedorezov et al. | |
| 2013/0296116 A1* | 11/2013 | Dai | B60W 10/08 |
| | | | 477/5 |
| 2015/0066264 A1* | 3/2015 | Wang | B60W 20/108 |
| | | | 701/22 |
| 2015/0087473 A1* | 3/2015 | Goleski | F16H 3/62 |
| | | | 475/288 |

* cited by examiner

US 9,827,978 B2

METHOD OF ENGAGING TRANSMISSION SYSTEM OF A HYBRID VEHICLE

TECHNICAL FIELD

This disclosure relates to the field of vehicle controls. More particularly, the disclosure pertains to use of a traction motor and auxiliary pump to engage a transmission following a vehicle start event.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Automotive transmissions generally offer at least one negative speed ratio for reverse movement. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Many transmissions are designed to operate at a discrete number of fixed speed ratios. The available speed ratios may be referred to as gears or gear ratios even if there is not a direct correspondence between each ratio and a particular physical gear within the transmission. The ratios are typically numbered starting from the highest speed ratio and progressing to lower speed ratios. For example, 1st gear may have a speed ratio of 4.5, 2nd gear a speed ratio of 3.0, 3rd gear a speed ratio of 2.3, etc. A particular speed ratio from the set of available speed ratios may be selected by engaging particular shift elements such as clutches or brakes. Shift elements may include actively controlled devices and passively controlled devices like one way clutches. Typically, shift elements are engaged by routing pressurized fluid to corresponding clutch apply circuits in a transmission valve body.

Some vehicles, commonly called hybrid electric vehicles utilize one or more traction motors and electrical energy storage, such as a battery, to reduce fuel consumption. In a number of operating conditions, the engine can be shut off and all propulsion performed by the traction motor using energy stored in the battery. The battery is charged by recapturing energy during braking. Additionally, when the engine is running, it may produce more power than needed for current propulsion with the extra power stored in the battery. Since engines are typically more efficient when operating at higher power levels, this reduces total fuel consumption. In a conventional vehicle, a number of vehicle functions rely on continuous power from the engine. In a hybrid vehicle, since the engine may be off much of the time, these functions must be implemented differently. One such function is the provision of pressurized hydraulic fluid to engage transmission shift elements.

SUMMARY OF THE DISCLOSURE

A vehicle includes a discrete ratio transmission, a primary pump, a secondary pump, a valve body, a traction motor driveably connected to the transmission input, a drive selector, and a controller. The primary pump, driven by the transmission input, supplies fluid at an elevated pressure to a line pressure circuit in the valve body. The secondary pump, not driven by the transmission input, maintains the pressure in the line pressure circuit. The valve body routes fluid from the line pressure circuit to shift elements of the transmission. The controller is programmed to respond to movement of the drive mode selector by increasing the speed of the traction motor and commanding the valve body to direct fluid to some of the shift element of the transmission to establish a power flow path and then to reduce the speed of the traction motor and maintain the power flow path using the secondary pump. The controller may maintain the speed of the traction motor at zero between a vehicle start event, such as a key on event, and movement of the drive mode selector. The vehicle may also include an engine selectively coupled to the transmission input by a disconnect clutch. The controller may be programmed to start the engine by engaging the disconnect clutch or using a separate starter motor.

A method of engaging a transmission of a hybrid electric vehicle includes increasing the speed of a traction motor to provide flow of pressurized fluid to at least one transmission shift element and then reducing the speed of the traction motor and maintaining the pressure using an auxiliary fluid pressure source. The traction motor may be selectively coupled to an internal combustion engine by a disconnect clutch. The auxiliary fluid pressure source may be a separate pump driven by an electric motor. The speed of the traction motor may be maintained at zero following a vehicle start event and then increased in response to a shift into a drive mode. The speed of the traction motor may be increased again in response to a torque request.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
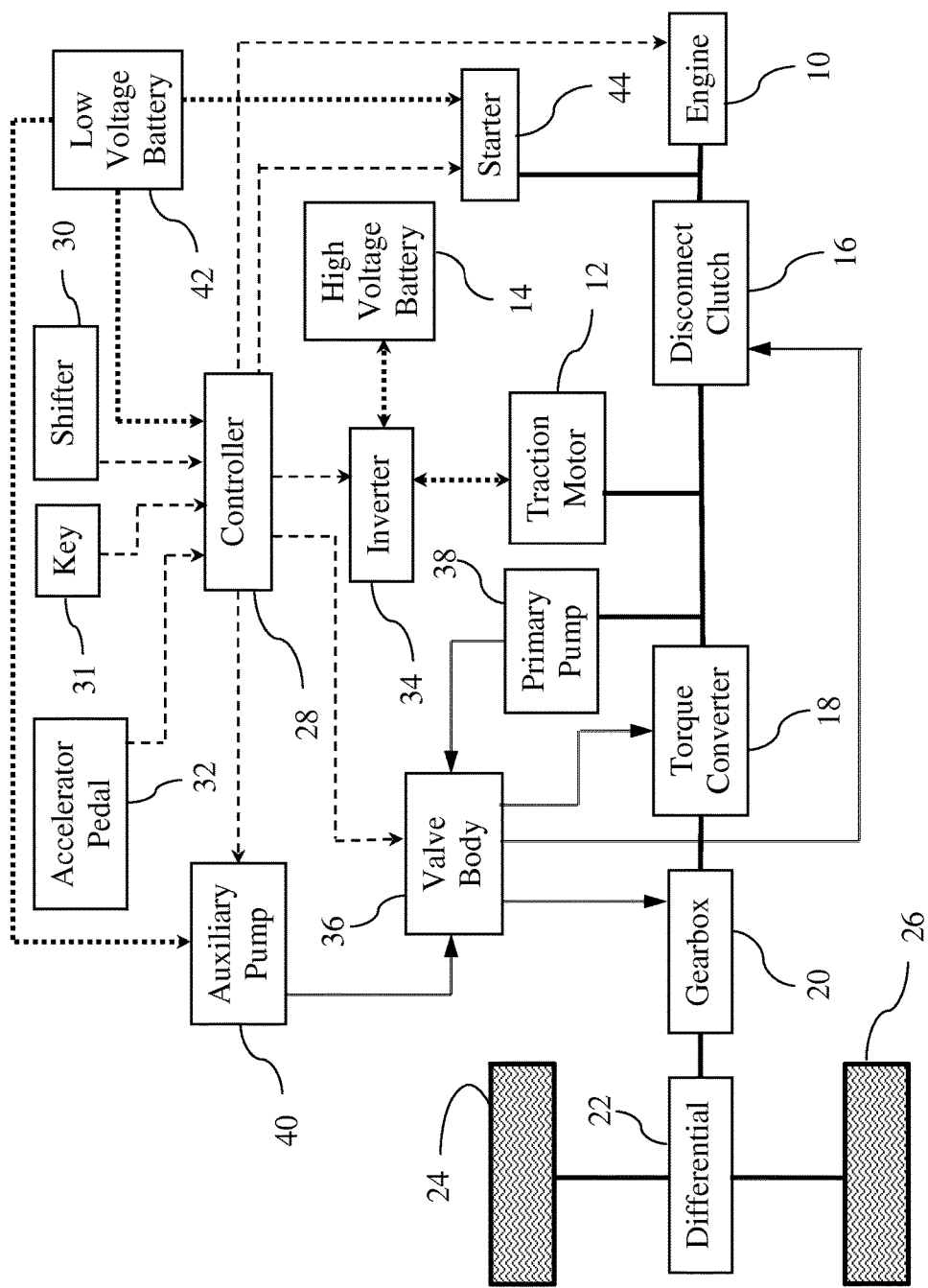
FIG. 1 is a schematic representation of a hybrid vehicle powertrain including a discrete ratio transmission.

FIG. 1 schematically illustrates a hybrid electric vehicle powertrain. Physical placement of the components within the vehicle may vary. Mechanical power flow connections are illustrated with bold solid lines. Mechanical power flow connections may include shafts and/or fixed ratio gearing. Elements are fixedly coupled if they rotate together as a unit in all operating conditions and selectively coupled if they rotate as a unit only when a shift element is engaged. Elements are driveably connected if a fixed power flow path transmits power between them and constrains them to rotate at proportional speeds. Electric power flow is illustrated by bold dotted lines. Flow of hydraulic fluid is illustrated by narrow solid lines. Dashed lines indicate signal flow, which may take the form of low current electrical connections.

Mechanical power to propel the vehicle is generated by a combination of engine 10 which converts chemical energy of liquid or gaseous fuel and traction motor 12 using energy stored in high voltage battery 14. Traction motor 12 may be, for example, a permanent magnet synchronous motor. Engine 10 is selectively connected to the powertrain by disconnect clutch 16. The mechanical power produced by engine 10 and traction motor 12 is conditioned for current vehicle needs by torque converter 18, gearbox 20, and differential 22. Torque converter 18 is a launch device which enables the transmission of torque while the vehicle is moving too slowly to establish a fixed ratio connection. An impeller fixed to the traction motor rotor hydro-dynamically drives a turbine fixed to the input shaft of gearbox 20. Torque converter 18 may include a stator that enables torque multiplication when the turbine is rotating slower than the impeller. Torque converter 18 may also include a lock-up clutch that selectively transmits torque through friction rather than hydro-dynamically to increase power transfer efficiency at higher vehicle speeds. In alternative embodiments, torque converter 18 may be replaced by a launch clutch. Gearbox 20 selectively establishes one of a number of available power flow paths, each having a different speed ratio. At low vehicle speed, a power flow path providing torque multiplication optimizes acceleration performance. At higher vehicle speed, a power flow path providing speed multiplication optimizes fuel economy. For reverse, a power flow path is selected that reverses the direction of rotation. Differential 22 multiplies the torque by a final drive ratio, changes the axis of rotation by 90 degrees, and divides the power between a left wheel 24 and a right wheel 26, permitting slight wheel speed differences as the vehicle turns a corner.

The powertrain is controlled by controller 28. Controller 28 may be a single micro-processor or may be a number of communicating micro-processors. For example, controller 28 may include a vehicle system controller, an engine controller, and a transmission controller communicating via a Controller Area Network (CAN). Controller 28 receives signals from a number of sensors including a shifter 30, ignition switch 31, and an accelerator pedal 32. Based on these signals, controller 28 determines the magnitude and direction of torque demanded by the driver and determines whether to deliver that torque using engine 10, traction motor 14, or a combination of the two. Controller 28 controls the torque delivered by the engine by sending signals to the engine to control throttle opening, fuel injection, spark, etc. Controller 28 controls the torque delivered by traction motor 12 by sending signals to inverter 34. Inverter 34 is connected to high voltage battery 14 by a Direct Current (DC) bus and is connected to traction motor 12 by a three phase Alternating Current (AC) bus.

Controller 28 controls disconnect clutch 16, torque converter 18, and gearbox 20 indirectly by sending signals to valve body 36. Valve body 36, in turn, adjusts the pressure in various hydraulic circuits to control the torque capacity of disconnect clutch 16, the lock-up clutch of torque converter 18, and each of the shift elements of gearbox 20. Specifically, fluid flows from a line pressure circuit, through a number of solenoid controlled valves, into the respective circuits. The pressure in each circuit is less than line pressure by an amount that is a function of the flow rate and the size of the valve opening. The solenoid adjusts the valve opening such that the pressure is proportional to a signal electrical current from controller 28. Fluid is provided to the line pressure circuit by primary pump 38 and/or auxiliary pump 40. Primary pump 38 may be a positive displacement pump driven by the rotor of traction motor 12 or, when disconnect clutch 16 is engaged, by the engine 10. The flow rate from primary pump 38 is proportional to the pump displacement and to the speed of the pump. Auxiliary pump 40 may be driven by a relatively small, low voltage electrical motor in response to commands from controller 28. To reduce cost, auxiliary pump 40 may be designed with limited maximum flow rate capability. Auxiliary pump 40 is powered by low voltage battery 42. Low voltage battery 42 may be charged by an engine driven alternator or by high voltage battery 14 via a DC/DC converter.

Two mechanisms are provided for starting engine 10. When disconnect clutch 16 is disengaged, controller 28 may command starter 44 to rotate engine 10 up to a speed at which the engine may be started. Starter 44 receives its power from low voltage battery 42. Because the torque is limited, a high gear ratio is often used. Durability of starter 44 may make it unsuitable for the frequent engine starts associated with hybrid vehicle operation. Alternatively, traction motor 12 in combination with disconnect clutch 16 may be used to accelerate engine 10. If traction motor 12 is rotating faster than the idle speed of the engine, engaging disconnect clutch 16 brings engine 10 up to operating speed quickly. However, to avoid fluctuations in powertrain output torque, traction motor 12 and disconnect clutch 16 must be carefully controlled during the engine start process.

Figure 2:
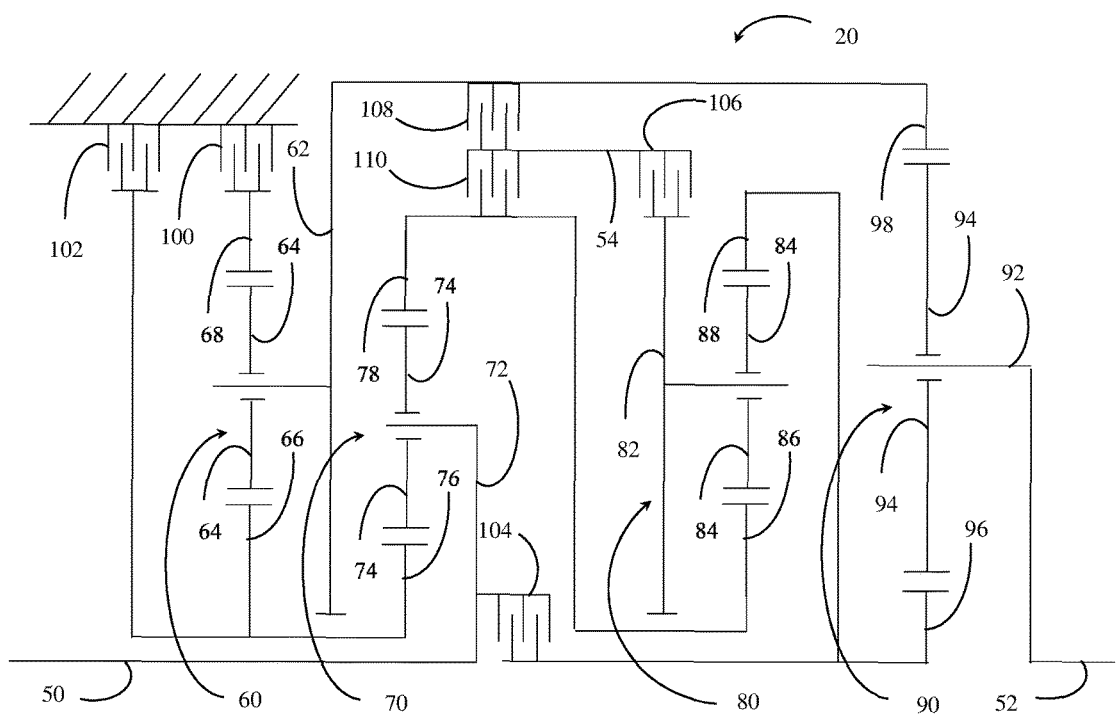
FIG. 2 is a schematic diagram of an exemplary gearing arrangement for the discrete ratio transmission of the vehicle of FIG. 1.

An example gearbox 20 is schematically illustrated in FIG. 2. Input shaft 50 is fixedly coupled to the turbine of torque converter 18. Output shaft 52 is fixedly coupled to the input of differential 22 via a driveshaft. The gearbox utilizes four simple planetary gear sets 60, 70, 80, and 90. A planet carrier 62 rotates about a central axis and supports a set of planet gears 64 such that the planet gears rotate with respect to the planet carrier. External gear teeth on the planet gears mesh with external gear teeth on a sun gear 66 and with internal gear teeth on a ring gear 68. The sun gear and ring gear are supported to rotate about the same axis as the carrier. Gear sets 70, 80, and 90 are similarly structured.

Sun gear 66 is fixedly coupled to sun gear 76, carrier 62 is fixedly couple to ring gear 98, ring gear 78 is fixedly coupled to sun gear 86, ring gear 88 is fixedly coupled to sun gear 96, input shaft 50 is fixedly coupled to carrier 72, and output shaft 52 is fixedly coupled to carrier 92. Ring gear 68 is selectively held against rotation by brake 100 and sun gears 66 and 76 are selectively held against rotation by brake 102. Input shaft 50 is selectively coupled to ring gear 88 and sun gear 96 by clutch 104. Intermediate shaft 54 is selectively coupled to carrier 82 by clutch 106, selectively coupled to carrier 62 and ring gear 98 by clutch 108, and selectively coupled to ring gear 78 and sun gear 86 by clutch 110.

As shown in Table 1, engaging the clutches and brakes in combinations of four establishes ten forward speed ratios and one reverse speed ratio between input shaft 50 and output shaft 52. An X indicates that the clutch is required to establish the power flow path. An (X) indicates the clutch can be applied but is not required. In order to prepare the vehicle for forward movement, at least three shift elements 100, 102, and 104 must be engaged. In order to prepare the vehicle of reverse movement, four shift elements must be engaged 100, 102, 106, and 108.

TABLE 1

|      | 100 | 102 | 104 | 106 | 108 | 110 | Ratio | Step |
|------|-----|-----|-----|-----|-----|-----|-------|------|
| Rev  | X   | X   |     | X   | X   |     | -4.79 | 102% |
| $1^{st}$ | X | X | X | (X) |   |   | 4.70  |      |
| $2^{nd}$ | X | X |   | X |   | X | 2.99  | 1.57 |
| $3^{rd}$ | X |   | X | X |   | X | 2.18  | 1.37 |
| $4^{th}$ | X |   |   | X | X | X | 1.80  | 1.21 |
| $5^{th}$ | X |   | X |   | X | X | 1.54  | 1.17 |
| $6^{th}$ | X |   |   | X | X | X | 1.29  | 1.19 |
| $7^{th}$ |   |   | X | X | X | X | 1.00  | 1.29 |
| $8^{th}$ |   | X | X | X | X |   | 0.85  | 1.17 |
| $9^{th}$ |   | X | X |   | X | X | 0.69  | 1.24 |
| $10^{th}$ |  | X |   | X | X | X | 0.64  | 1.08 |

Shift elements 100-110 are preferably hydraulically actuated wet friction clutches. A wet friction clutch includes a clutch housing that is fixed to rotate with one of the selectively coupled components and a hub fixed to rotate with the other selectively coupled component. For a wet friction brake, the clutch housing is typically integrated with the transmission case. A set of friction plates is splined to the hub and interleaved with a set of separator plates splined to the housing. To engage a clutch, fluid is supplied under pressure to an apply chamber in the housing, forcing a piston to squeeze the friction plates and separator plates such that friction prevents relative rotation. A release spring forces the piston to a disengaged position. In the case of rotating clutches (non-brakes), unpressurized fluid is generally also supplied to a balance chamber in the housing in order to counteract any centrifugal forces tending to pressurize the fluid in the apply chamber.

When the vehicle is parked for a period of time, fluid drains out of the apply chambers and the balance chambers. In order to prepare the vehicle for motion after a key start event, a substantial volume of fluid must be pumped into gearbox 20 to stroke the pistons of the three or four shift elements that are to be engaged. Although auxiliary pump 40 is capable of generating enough pressure to fill these chambers, it may not be capable of providing a high enough flow rate to fill them quickly enough. If the process of applying the clutches takes too long, the vehicle will not be ready to move when the driver requests torque by pressing the accelerator pedal.

Figure 3:
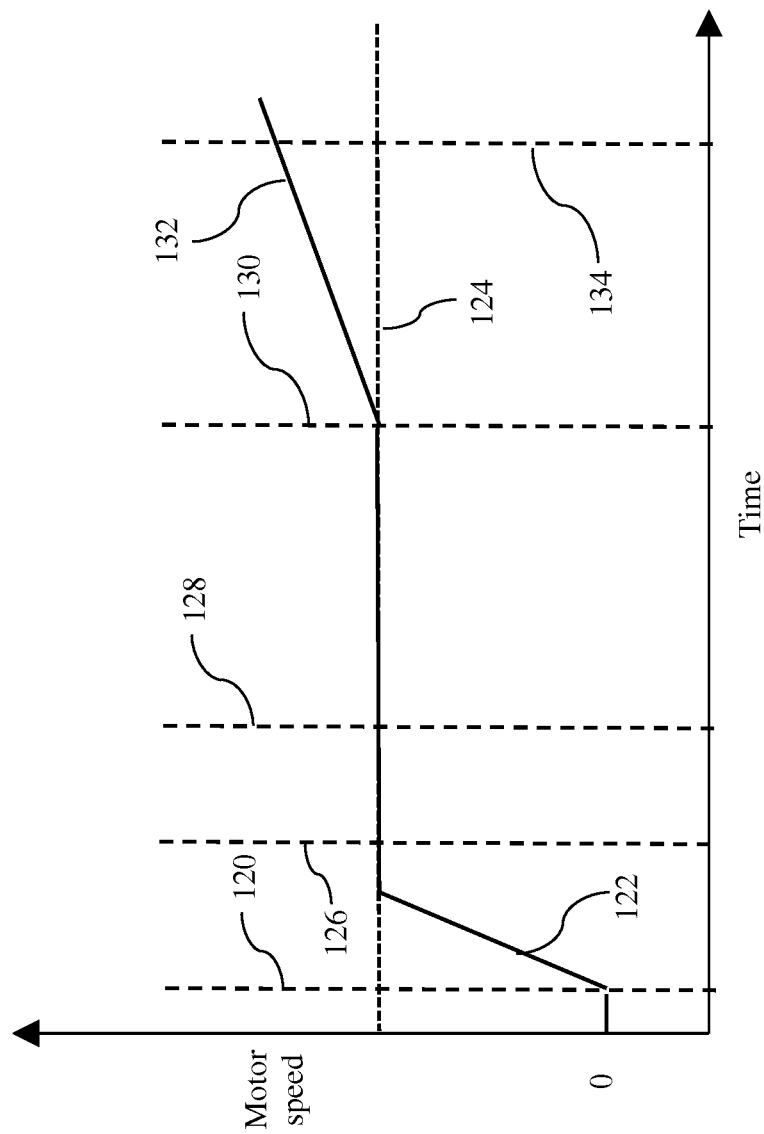
FIG. 3 is a graph of motor speed as a function of time for a vehicle start event, selection of a drive mode, and a torque demand according to a first control method.

To ensure that the vehicle is ready to move in response to a torque request, the controller may control the speed of traction motor 12 as shown in FIG. 3. In response to a vehicle start event 120, the controller increases the motor speed at 122 to an idle speed 124. A vehicle start event is an indication from the driver that the driver is preparing for travel but is not yet ready for the vehicle to move. A vehicle start event may be triggered, for example, by the driver rotating a key in ignition switch 31. Alternatively, a vehicle may provide a start button or some other means for the driver to provide this indication. Prior to the vehicle start event, most vehicle systems, including controller 28, are not powered. In response to rotation of motor 12, primary pump 38 provides fluid to the line pressure circuit. The controller may direct valve body 36 to route some of this fluid to shift elements 100 and 102 which are needed in both reverse and 1st gear. However, no power flow path is established at this point. In response to a shift into drive or reverse at 126, the controller directs valve body 36 to route fluid from the line pressure circuit to the shift elements needed to establish the corresponding power flow path. The shift into drive or reverse may be indicated by driver manipulation of shifter 30. Consequently, the power flow path is established at 128. Although the powertrain is prepared for motion at 128, the vehicle does not move until the driver indicates a torque request at 130 by releasing the brake pedal and depressing accelerator pedal 32. (Some vehicle may interpret release of both pedals as a small torque request.) The motor speed is maintained at idle speed until torque request event 130, at which time the controller may command a motor speed increase 132 if needed to provide the requested torque. Finally, at 134, the controller may start engine 10 after the vehicle has begun to move.

In the scenario illustrated by FIG. 3, motor 12 is maintained at idle speed from shortly after the vehicle start event 120 until the torque request 130. This could be several minutes as the driver enters a destination into the GPS system, tunes the radio, and waits for traffic to clear. During this time, electrical power is drained from high voltage battery 14. Additionally, the driver may be annoyed by the sound of the motor turning.

Figure 4:
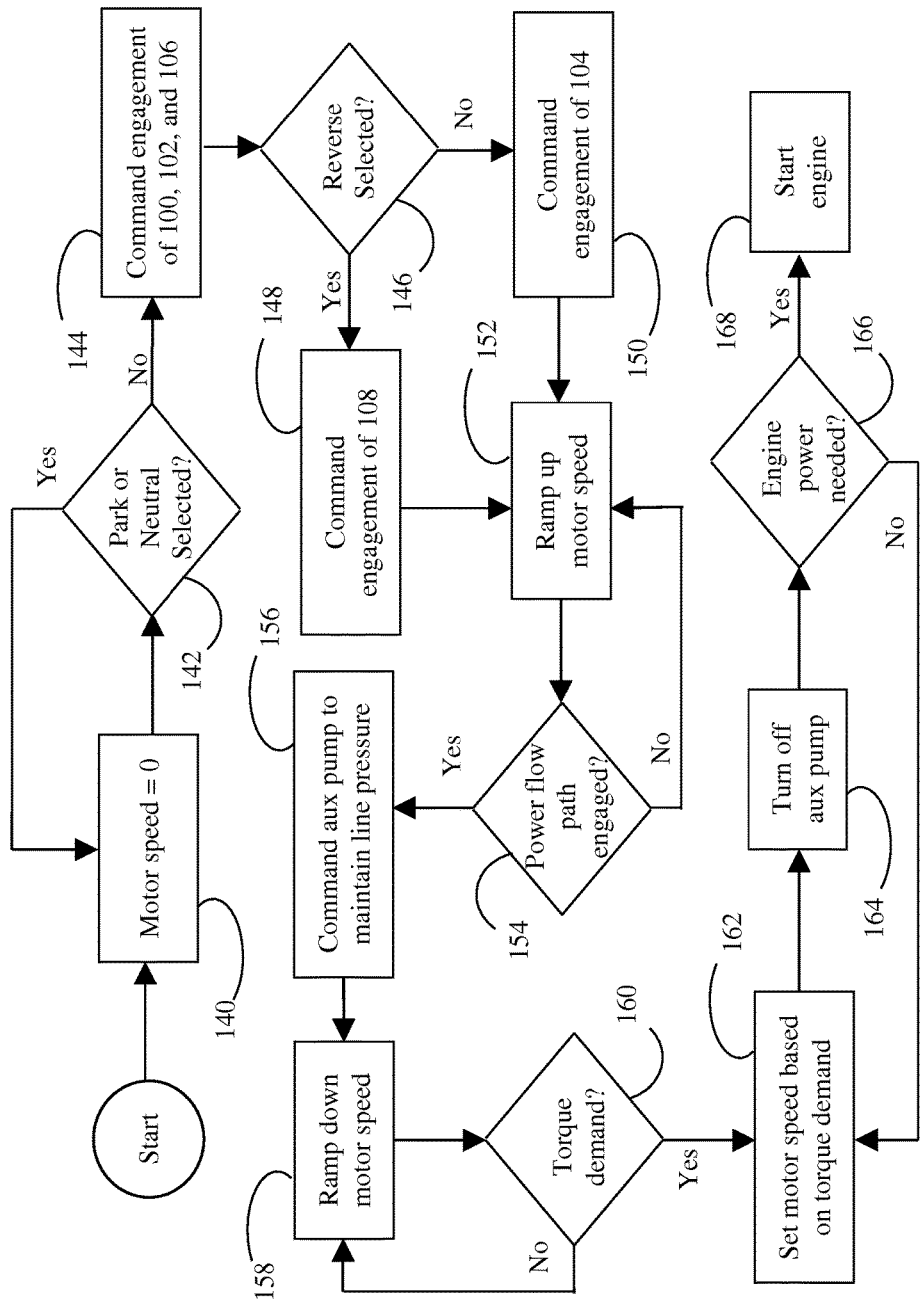
FIG. 4 is a flow chart describing a second control method that reduces fuel consumption relative to the first control method.
Figure 5:
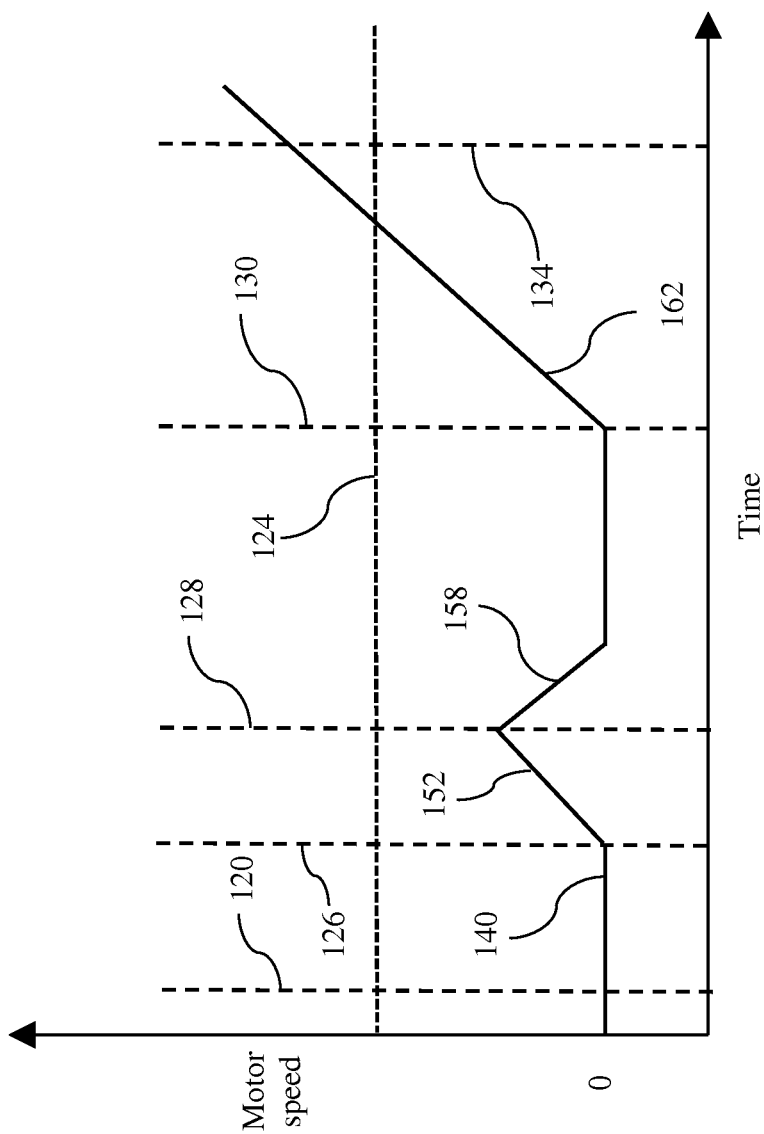
FIG. 5 is a graph of motor speed as a function of time for a vehicle start event, selection of a drive mode, and a torque demand according to the control method of FIG. 4.

FIG. 4 is a flow chart for a process of controlling traction motor 12, shift elements 100-110, and auxiliary pump 40 which reduces the use of traction motor 12 during the interval between a vehicle start event and a torque demand. Consequently, less fuel is consumed. FIG. 5 illustrates the corresponding motor speed during this interval of time. The method starts in response to a vehicle start event such as turning an ignition key. At 140, the motor speed is set to zero. At 142, the controller branches back to 140 as long as shifter 30 remains in a Park or Neutral position such that motor speed remains zero. When shifter 30 is moved at 126, control moves to 144 where the controller commands engagement of the shift elements that are applied in both Reverse and 1st. Depending on whether Reverse or Drive has been selected, as determined at 146, the controller commands engagement of either clutch 108 at 148 or clutch 104 at 150.

Due to the time required to fill the respective clutch apply chambers after the engagement command, these shift elements will not become engaged immediately. At 152, the controller commands the motor speed to increase by adding an increment to the present commanded motor speed at regular intervals. The motor speed continues to increase until the controller detects engagement of the corresponding power flow path at 154 at time 128. Until the shift elements are engaged to establish the power flow path, the torque converter turbine will increase in speed following the motor speed. Once the power flow path is established, the turbine speed will decrease to zero. Establishment of the power flow path can be detected by the controller by monitoring a turbine speed sensor. At 156, the controller commands the auxiliary pump to maintain line pressure and commands starts decreasing the motor speed at 158. The controller subtracts an increment from the present commanded motor speed at regular intervals until the commanded speed is zero, or until a torque demand is detected at 160. In some cases, the torque demand may occur before the motor speed reaches zero. In other cases, as shown in FIG. 5, the motor may be at zero speed for a period of time before a torque demand occurs at 130.

At 162, the motor speed is set based on the magnitude of the torque demand and a measured turbine speed. For a high torque demand, the motor is set considerably higher than the turbine speed in order to induce a high turbine torque. For modest torque demands, the margin over turbine speed is smaller. As long as the torque demand is positive, motor speed will increase steadily as vehicle speed, and therefore turbine speed, increases. Once the motor speed is sufficient to maintain line pressure, the auxiliary pump is commanded off at 164. Since the state of the shift elements is not changing, the flow demands are low and therefore the motor speed required to maintain line pressure is low. When the controller determines at 166 that engine power is needed, such as at time 134, the engine is started at 168.

In some embodiments, the sequence of some of the steps may be skipped or performed in a different order. For example, in some embodiments, the shift elements that are common to both Reverse and 1st gear may be commanded to engage before the shifter is moved out of Park or Neutral. The motor may be temporarily commanded to increase in speed to provide the necessary flow to engage these shift elements in a similar fashion to after the shift out of Park in the example. Then, the motor speed may be decreased and line pressure maintained by the auxiliary pump.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle comprising:
    a discrete ratio transmission having an input and an output;
    a primary pump drivably connected to the input and configured to supply a fluid at an elevated pressure to a line pressure circuit;
    a secondary pump configured to maintain the elevated pressure in the line pressure circuit;
    a valve body configured to route the fluid from the line pressure circuit to shift elements of the transmission;
    a traction motor drivably connected to the input;
    a drive mode selector; and
    a controller programmed to
        in direct response to movement of the drive mode selector, increase a speed of the traction motor and control the valve body to direct the fluid to some of the shift elements to establish a power flow path from the input to the output, and
        in response to establishing the power flow path, reduce the speed of the traction motor and maintain the transmission in the drive state using the secondary pump.

2. The vehicle of claim 1 wherein the controller is further programmed to maintain the speed of the traction motor at zero between a vehicle start event and the movement of the drive mode selector.

3. The vehicle of claim 1 wherein the controller is further programmed to increase the speed of the traction motor in response to a torque demand following the movement of the drive mode selector.

4. The vehicle of claim 1 wherein the discrete ratio transmission comprises:
    a torque converter having an impeller coupled to the input and a turbine; and
    a discrete ratio gearbox configured to establish a discrete number of power flow paths between the turbine and the output, each power flow path associated with a predetermined speed ratio.

5. The vehicle of claim 1 wherein establishing the power flow path comprises engaging at least three of the shift elements of the transmission.

6. The vehicle of claim 5 wherein establishing the power flow path comprises engaging four shift elements of the transmission.

7. The vehicle of claim 1 further comprising:
    an internal combustion engine; and
    a disconnect clutch configured to selectively couple the internal combustion engine to the input.

8. The vehicle of claim 7 wherein the controller is further programmed to start the engine while the traction motor is rotating by increasing a torque capacity of the disconnect clutch.

9. The vehicle of claim 7 wherein the controller is further programmed to start the engine using a separate starter motor.

10. A method of engaging a transmission of a hybrid electric vehicle comprising:
    in direct response to a shift into a drive mode, increasing a speed of a traction motor to provide a flow of pressurized fluid to a shift element within the transmission; and
    in response to completing engagement of the shift element, reducing the speed of the traction motor and maintaining the shift element in an engaged state using an auxiliary fluid pressure source.

11. The method of claim 10 wherein increasing the speed of the traction motor is performed in response to a shift into a drive mode.

12. The method of claim 11 wherein the drive mode is a reverse drive mode.

13. The method of claim 11 further comprising maintaining the speed of the traction motor at zero between a vehicle start event and the shift into the drive mode.

14. The method of claim 11 further comprising increasing the speed of the motor in response to a torque request after the shift into the drive mode.

15. The method of claim 10 further comprising starting an internal combustion engine by increasing a torque capacity of a disconnect clutch to selectively couple the internal combustion engine to the traction motor.

16. The method of claim 10 further comprising starting an internal combustion engine using a separate starter motor.

17. The method of claim 10 wherein the auxiliary fluid pressure source is a separate pump driven by a separate electric motor.

18. A method of operating a hybrid vehicle comprising:
   in direct response to selection of a drive mode, increasing a speed of a traction motor drivably connected to a primary pump to provide fluid to a shift element to establish a power flow path between the traction motor and vehicle wheels; and
   in response to establishment of the power flow path, reducing the speed of the traction motor and maintaining the power flow path using an auxiliary fluid pressure source.

19. The method of claim 18 further comprising maintaining the speed of the traction motor at zero between a vehicle start event and selection of the drive mode.

20. The method of claim 19 further comprising starting an engine by increasing a torque capacity of a disconnect clutch to selectively couple the engine to the traction motor.

\* \* \* \* \*